United States Patent
Hwang

(10) Patent No.: US 12,117,305 B2
(45) Date of Patent: Oct. 15, 2024

(54) NAVIGATION SYSTEM AND CONTROL METHOD THEREOF

(71) Applicants: HYUNDAI MOTOR COMPANY, Seoul (KR); KIA CORPORATION, Seoul (KR)

(72) Inventor: Junsik Hwang, Suwon-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 25 days.

(21) Appl. No.: 17/396,420

(22) Filed: Aug. 6, 2021

(65) Prior Publication Data

US 2022/0136852 A1 May 5, 2022

(30) Foreign Application Priority Data

Nov. 4, 2020 (KR) .................. 10-2020-0146279

(51) Int. Cl.
*G01C 21/34* (2006.01)
*G01C 21/36* (2006.01)

(52) U.S. Cl.
CPC ..... *G01C 21/3484* (2013.01); *G01C 21/3415* (2013.01); *G01C 21/3492* (2013.01); *G01C 21/3664* (2013.01)

(58) Field of Classification Search
CPC ............ G01C 21/3484; G01C 21/3415; G01C 21/3492; G01C 21/3664; G01C 21/3676; G01C 21/3694
See application file for complete search history.

(56) References Cited

U.S. PATENT DOCUMENTS

| | | | |
|---|---|---|---|
| 2015/0160030 A1* | 6/2015 | Costello ............. | G01C 21/3476 701/533 |
| 2016/0187152 A1* | 6/2016 | Tanizaki ............ | G01C 21/3614 701/414 |
| 2016/0245663 A1* | 8/2016 | van Dok ............ | G01C 21/3676 |
| 2018/0038710 A1* | 2/2018 | Shang .................... | G01C 21/36 |
| 2019/0086224 A1* | 3/2019 | Sharma ............... | G08G 1/0125 |
| 2020/0202600 A1* | 6/2020 | Chang ..................... | G09G 5/14 |

FOREIGN PATENT DOCUMENTS

| | | | | |
|---|---|---|---|---|
| CN | 107545316 A | * | 1/2018 | |
| EP | 1186866 B1 | * | 1/2007 | ......... G01C 21/3453 |

OTHER PUBLICATIONS

Draeger, Machine Translation of EP 1186866, (file EP_1186866_machine_translation) (Year: 2007).*
Guo, Machine Translation of CN 107545316, (file CN_107545316_machine_translation) (Year: 2018).*
Machine translation of EP 1186866 (Year: 2007).*

* cited by examiner

*Primary Examiner* — Anne Marie Antonucci
*Assistant Examiner* — Patrick M Brady
(74) *Attorney, Agent, or Firm* — Slater Matsil, LLP

(57) ABSTRACT

A navigation system is provided. The system may include a display configured to display a screen; an input device configured to acquire a user input; and a controller configured to generate a basic route based on a destination input through the input device, acquire a user-set route through the input device, generate a modified route based on the basic route, the user-set route and road information, and control the display to display the modified route.

18 Claims, 14 Drawing Sheets

[PRIOR ART]

[PRIOR ART]

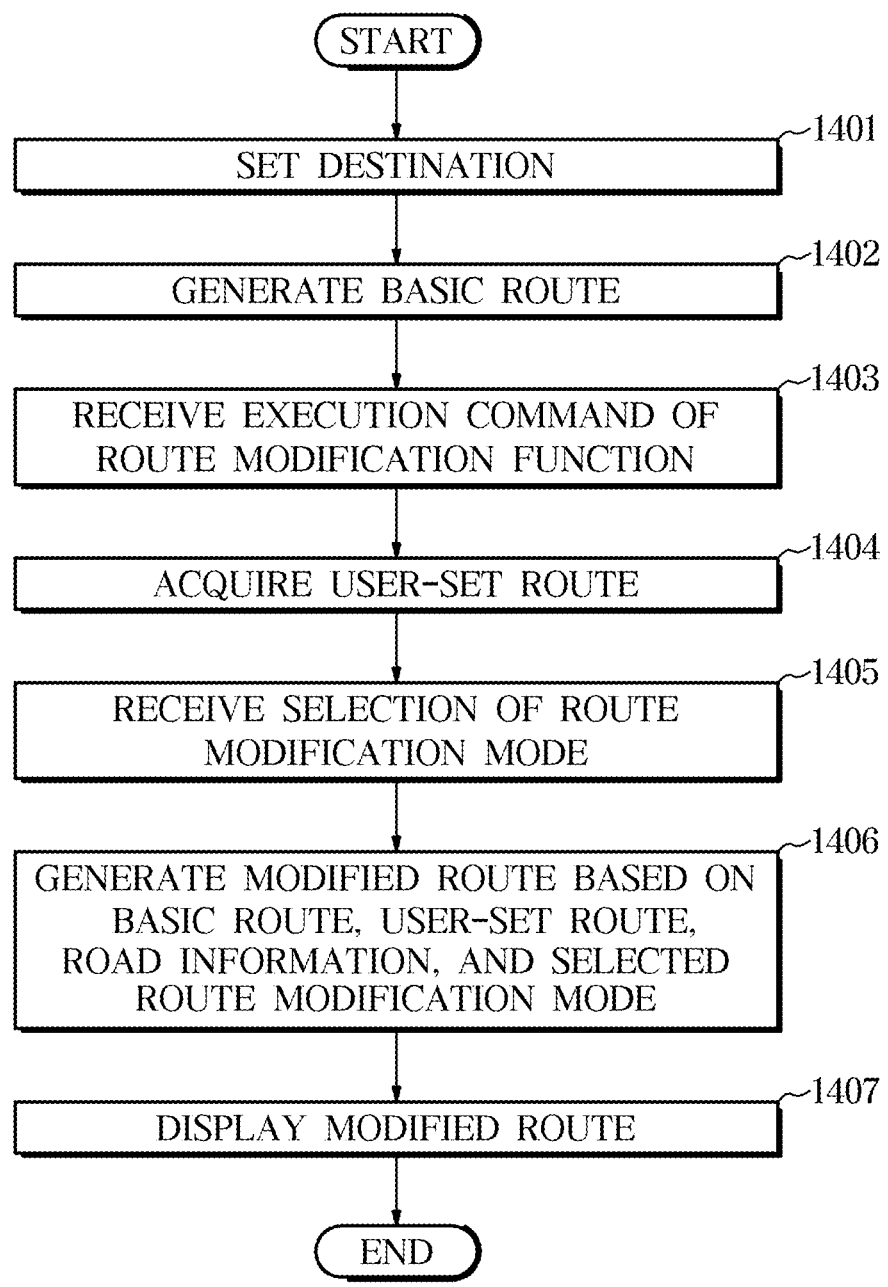

NAVIGATION SYSTEM AND CONTROL METHOD THEREOF

CROSS-REFERENCE TO RELATED APPLICATION

This application claims the priority to and the benefit of Korean Patent Application No. 10-2020-0146279, filed on Nov. 4, 2020, the disclosure of which is incorporated herein by reference in its entirety.

TECHNICAL FIELD

The present disclosure relates to a navigation system and a control method thereof.

BACKGROUND

The navigation system guides the driving route to the destination. Specifically, the navigation system acquires location information through a global positioning system, and searches for an optimal route from the current location to the destination based on the current location, and the destination and route search algorithm input from the user.

However, there are many cases where the user wants to go to a route other than the optimal route. For example, there is a case in which a user wants to detour to the outskirts to avoid an area with a lot of vehicles or wants to drive along a coastal road.

However, existing systems only provide an optimal route for reaching a destination in the minimum time or the shortest distance, but do not adequately provide a route desired by a user. As a result, a satisfactory route may not be established even if several waypoints are designated in order for a user to set a desired route.

SUMMARY

Therefore, the present disclosure provides a navigation system capable of providing a route desired by a user and a control method thereof.

Specifically, the present disclosure provides a navigation system capable of providing a driving route closest to a route arbitrarily input by a user, and a control method thereof.

In accordance with one aspect of the disclosure, a navigation system includes: a display configured to display a screen; an input device configured to acquire a user input; and a controller configured to generate a basic route based on a destination input through the input device, acquire a user-set route through the input device, generate a modified route based on the basic route, the user-set route and road information, and control the display to display the modified route.

The controller may be configured to extract at least one road adjacent to the user-set route from the road information and generate the modified route based on the extracted at least one road.

The controller may be configured to generate the modified route by giving priority to a road closest to the user-set route among the extracted at least one road.

The controller, when the road closest to the user-set route is a road that deviates from the driving direction or a road that disconnects the route, may be configured to generate the modified route using a next closest road among the extracted at least one road.

The controller, when a plurality of roads adjacent to one section of the user-set route exist and a difference between the distances from the user-set route to the plurality of roads is smaller than a predetermined value, may be configured to select a road that shortens a length of the modified route.

The controller, when a detour section for a straight road exists in the modified route and the ratio between a length of the detour section and a length of a straight line connecting a starting point and an endpoint of the detour section is greater than a predetermined value, may be configured to determine a final modified route using the straight road.

The controller may be configured to exclude a road including a no-traffic section among the extracted at least one road.

The controller may be configured to control the display to guide a selection of a route modification mode and generate the modified route by further reflecting the selected route modification mode, and the route modification mode may include a normal mode, a travel mode and a safe mode.

The controller may be configured to further extract at least one of a coastal road or a riverside road from the road information when the travel mode is selected, and generate the modified route by giving priority to at least one of the coastal road or the riverside road.

The controller may be configured to check a traffic delay road in the road information when the safe mode is selected, and exclude the traffic delay road when the traffic delay road is included in the extracted at least one road.

The input device may include a touch screen, and the controller may be configured to determine a user's drawing input input to the touch screen as the user-set route.

In accordance with another aspect of the disclosure, a control method of a navigation system includes: generating a basic route based on a destination input through an input device; acquiring a user-set route through the input device; generating a modified route based on the basic route, the user-set route and road information; and controlling a display to display the modified route.

The generating the modified route may include: extracting at least one road adjacent to the user-set route from the road information; and generating the modified route based on the extracted at least one road.

The generating the modified route may further include: generating the modified route by giving priority to a road closest to the user-set route among the extracted at least one road.

The generating the modified route may further include: when the road closest to the user-set route is a road that deviates from the driving direction or a road that disconnects the route, generating the modified route using a next closest road among the extracted at least one road.

The generating the modified route may further include: when a plurality of roads adjacent to one section of the user-set route exist and a difference between the distances from the user-set route to the plurality of roads is smaller than a predetermined value, selecting a road that shortens a length of the modified route.

The generating the modified route may further include: when a detour section for a straight road exists in the modified route and the ratio between a length of the detour section and a length of a straight line connecting a starting point and an endpoint of the detour section is greater than a predetermined value, determining a final modified route using the straight road.

The generating the modified route may further include: excluding a road including a no-traffic section among the extracted at least one road.

The control method may further include: controlling the display to guide a selection of a route modification mode, and the generating the modified route may include: reflecting the selected route modification mode, and the route modification mode may include a normal mode, a travel mode and a safe mode.

The generating the modified route may further include: further extracting at least one of a coastal road or a riverside road from the road information when the travel mode is selected; and generating the modified route by giving priority to at least one of the coastal road or the riverside road.

The generating the modified route may further include: checking a traffic delay road in the road information when the safe mode is selected; and excluding the traffic delay road when the traffic delay road is included in the extracted at least one road.

The acquiring the user-set route may include: determining a user's drawing input input to a touch screen of the input device as the user-set route.

DRAWINGS

These and/or other aspects of the disclosure will become apparent and more readily appreciated from the following description of the forms, taken in conjunction with the accompanying drawings of which:

FIG. 14 is a flowchart illustrating in more detail a control method of a navigation system in one form of the present disclosure.

DETAILED DESCRIPTION

Figure 1:
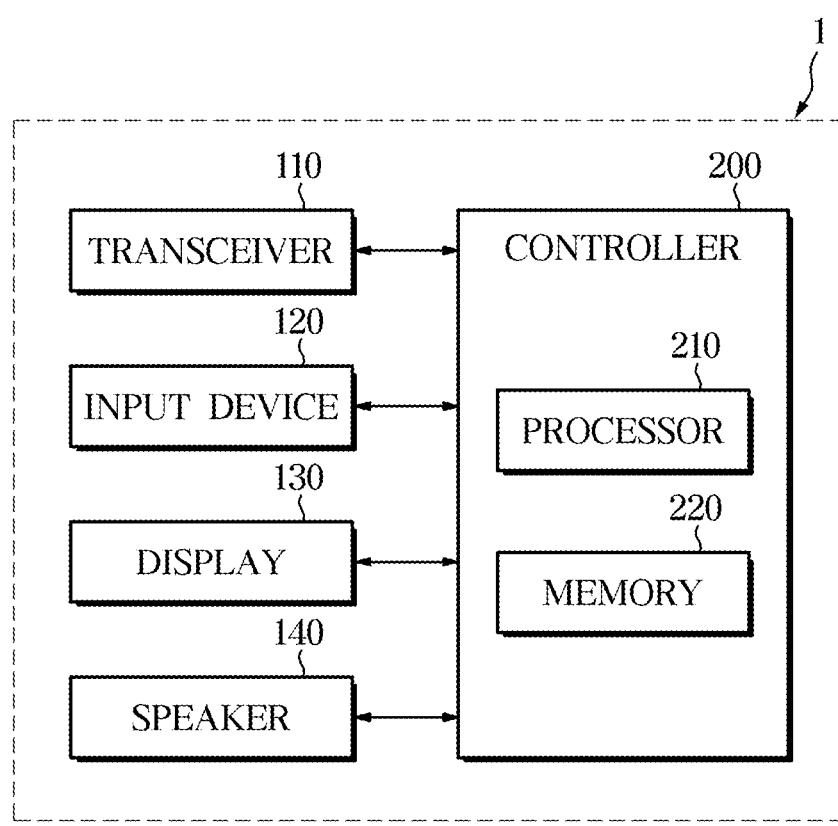
FIG. 1 illustrates a configuration of a navigation system in one form of the present disclosure.

Like reference numerals refer to like elements throughout the specification. Not all elements of the disclosure will be described, and description of what are commonly known in the art or what overlap each other in some forms of the present disclosure will be omitted. The terms as used throughout the specification, such as "~ part," "~ module," "~ member," "~ block," etc., may be implemented in software and/or hardware, and a plurality of "~ parts," "~ modules," "~ members," or "~ blocks" may be implemented in a single element, or a single "~ part," "~ module," "~ member," or "~ block" may include a plurality of elements.

It will be understood that when an element is referred to as being "connected" to another element, it can be directly or indirectly connected to the other element, wherein the indirect connection includes "connection" via a wireless communication network.

Also, when a part "includes" or "comprises" an element, unless there is a particular description contrary thereto, the part may further include other elements, not excluding the other elements.

It will be understood that, although the terms first, second, third, etc., may be used herein to describe various elements, it should not be limited by these terms. These terms are only used to distinguish one element from another element.

As used herein, the singular forms "a," "an" and "the" are intended to include the plural forms as well, unless the context clearly indicates otherwise.

An identification code is used for the convenience of the description but is not intended to illustrate the order of each step. Each of the steps may be implemented in an order different from the illustrated order unless the context clearly indicates otherwise.

Hereinafter, the operation principles and some forms of the disclosure will be described with reference to the accompanying drawings.

FIG. 1 illustrates a configuration of a navigation system in some forms of the present disclosure.

Referring to FIG. 1, the navigation system 1 may include an input device 120, a display 130, and a controller 200. In addition, the navigation system 1 may further include at least one of the transceiver 110 and the speaker 130. Although not shown, the navigation system 1 may further include a Global Positioning System (GPS), and may acquire the current location of the vehicle 1. The controller 200 is electrically connected to the components of the navigation system 1 and can control each component.

The transceiver 110 may acquire various information from an external device. The transceiver 110 may communicate with the road infrastructure device (V2I). In addition, the transceiver 110 may communicate with a personal terminal (V2P). For example, the transceiver 110 may acquire at least one of traffic information and road information from an external road infrastructure device.

The transceiver 110 may communicate with an external device using wireless communication technologies such as Wi-Fi, wireless local area network (WLAN), ultra-mobile broadband (UMB), and long term evolution (LTE).

The input device 120 may acquire a user input. Specifically, the input device 120 may receive an input related to various functions and/or operations of the navigation system 1. For example, the user may input a destination and a user-set route by manipulating the input device 120. The input device 120 may include an on/off button, a selection button, a physical button such as a button for executing various functions, a jog dial, and/or a touch pad. In addition, the input device 120 may include a touch screen provided integrally with the display 130.

The display 130 may display a screen. The display 130 may display information related to the operation of the navigation system 1. In addition, the display 130 may display a graphical user interface (GUI) capable of interacting with a user. The display 130 may include a touch screen and may receive a touch input from a user. The display 130 may convert the user's touch input into an electrical signal and transmit it to the controller 200. The controller 200 may process an electrical signal according to a user's touch input, and control the operation of the navigation system 1 in response thereto.

The display 130 may include a light emitting diode (LED) panel, an organic light emitting diode (OLED) panel, or a liquid crystal display (LCD) panel.

The speaker 140 may output auditory information related to the operation of the navigation system 1. For example, the speaker 140 may output a voice message for guiding a driving route. In addition, the navigation system 1 may be connected to a speaker provided in the vehicle 1, and the controller 200 may control a speaker provided in the vehicle 1.

The controller 200 may include a processor 210 and a memory 220. The memory 220 and the processor 210 may be integrated on one chip or physically separated from each other. Also, the controller 200 may include a plurality of processors 210 and a plurality of memories 220. The controller 200 may be electrically connected to the components of the navigation system 1.

The processor 210 may process various data. The processor 210 may include an image signal processor, a digital signal processor, and/or a micro control unit (MCU) that generates a control signal. The processor 210 may execute programs and/or instructions related to the operation of the navigation system 1.

The memory 220 may store a program and/or instructions for the processor 210 to process various data, and may store a program and/or instructions for the processor 210 to generate a control signal. Also, the memory 220 may store map data, road information, and traffic information.

The memory 220 may include non-volatile memory element such as cache, read only memory (ROM), programmable ROM (PROM), erasable programmable ROM (EPROM), electrically erasable programmable ROM (EEPROM), and flash memory. Further, the memory 220 may include a volatile memory element such as random access memory (RAM), and may include a storage medium such as a hard disk drive (HDD) or a CD-ROM.

Hereinafter, the operation of the navigation system 1 in some forms of the present disclosure will be described in detail.

Figure 2:
FIGS. 2 and 3 illustrate an example in which a driving route is provided in the prior art.
Figure 3:

FIGS. 2 and 3 illustrate an example in which a driving route is provided in the prior art.

Referring to FIG. 2, the conventional navigation system searches for a driving route to a destination and guides an optimal route R1. The optimal route R1 is generally the route that takes the minimum time to reach the destination or the route that is the shortest distance to the destination. However, the conventional navigation system does not provide a function that allows a user to arbitrarily set a route other than the optimal route.

A user may want to go to a route other than the optimal route. For example, when a user travels to an area such as Jeju Island, the user may want a route that runs along a coastal road. In this case, the user can modify the provided optimal route by additionally setting a waypoint located on a coastal road in addition to the destination.

In FIG. 3, it is shown that the user added two waypoints in order to generate a route running on a coastal road. However, the conventional navigation system provides the shortest route or minimum time route from the waypoint to the destination. Although the user can designate multiple waypoints, it is cumbersome to select a plurality of waypoints, and it is difficult to set a satisfactory route for the user.

The disclosed navigation system 1 can provide a route desired by a user. Specifically, the disclosed navigation system 1 can easily provide a driving route closest to a route arbitrarily input by a user.

Figure 4:
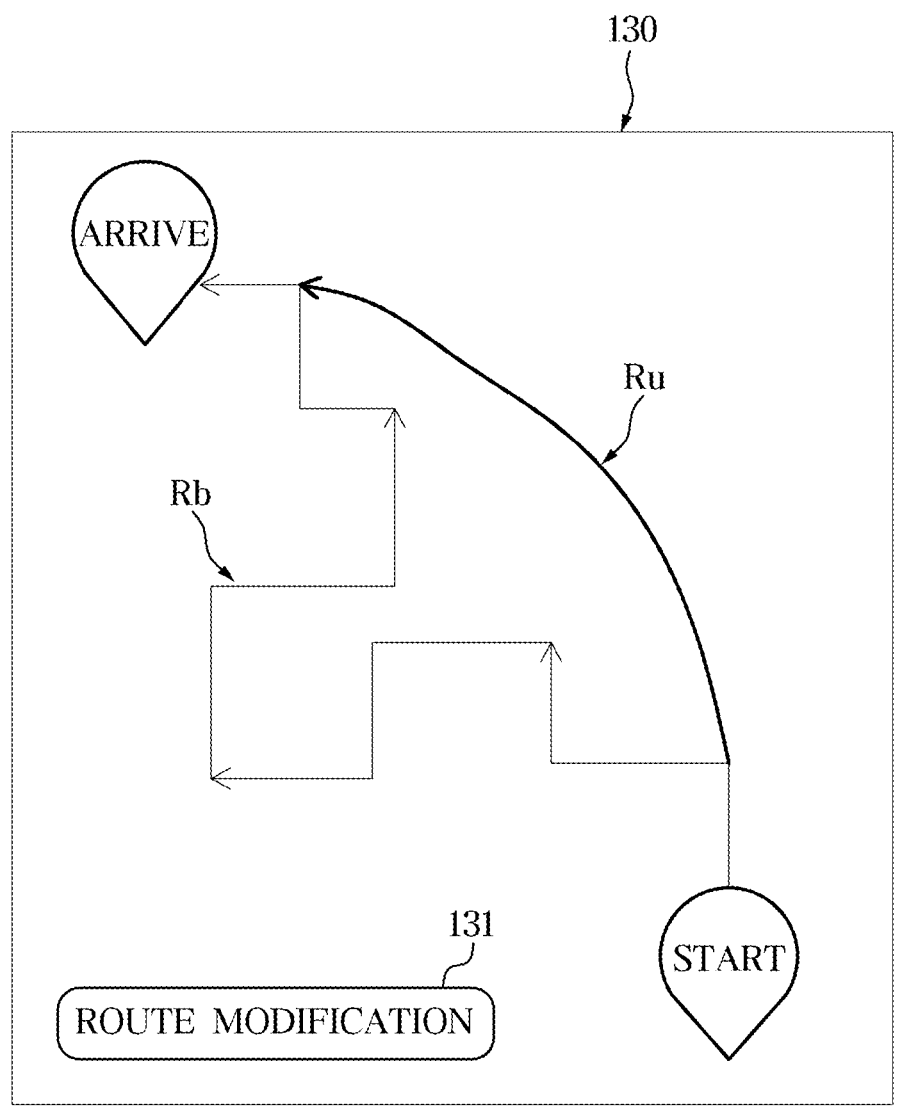
FIG. 4 illustrates an example in which a user-set route is input.

FIG. 4 illustrates an example in which a user-set route is input.

Referring to FIG. 4, the controller 200 of the navigation system 1 may generate a basic route Rb based on a destination input through the input device 120. The basic route Rb may be an optimal route including a shortest distance route or a minimum time route.

The user may input a user-set route through the input device 120. For example, the input device 120 may include a touch screen provided on the display 130, and the user may draw a user-set route Ru on the touch screen. A user may draw a desired route on the display 130 with a finger. The controller 200 may determine a user's drawing input to the display 130 including the touch screen as a user-set route.

Meanwhile, the display 130 may display the route modification button 131 together with the basic route Rb. The route modification button 131 is for inputting an execution command of the route modification function, and may be displayed in a GUI. When the route modification button 131 is provided, the user can input a user-set route after pressing the route modification button 131. The controller 200 may determine the user's drawing input transmitted from the input device 120 after the route modification button 131 is pressed as a user-set route.

Figure 5:
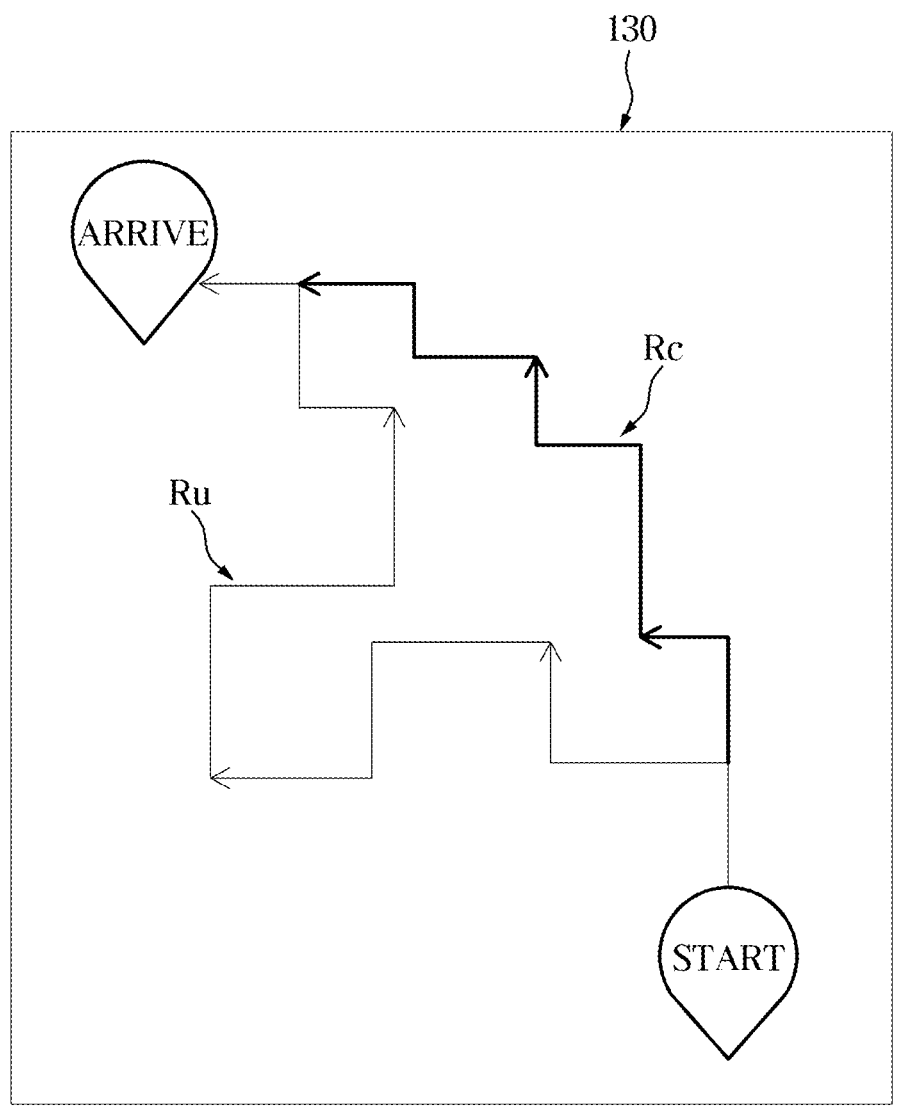
FIG. 5 illustrates an example in which a modified route is displayed.

FIG. 5 illustrates an example in which a modified route is displayed.

Referring to FIG. 5, the controller 200 of the navigation system 1 generates a modified route Rc based on a basic route Rb, a user-set route Ru and road information, and may control the display 130 to display the modified route Rc. The road information may be previously stored in the memory 220 or acquired from an external device. Also, the road information may include traffic information. The controller 200 may extract at least one road adjacent to the user-set route from road information, and generate a modified route Rc based on the extracted at least one road.

Figure 6:
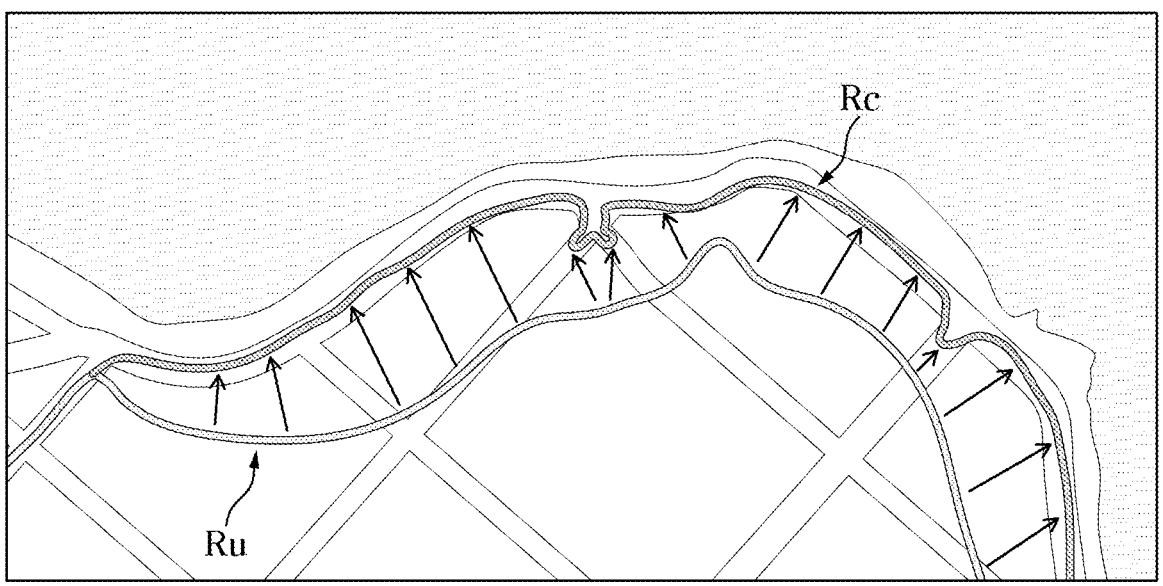
FIG. 6 illustrates a method of generating a modified route based on a road adjacent to a user-set route.
Figure 7:
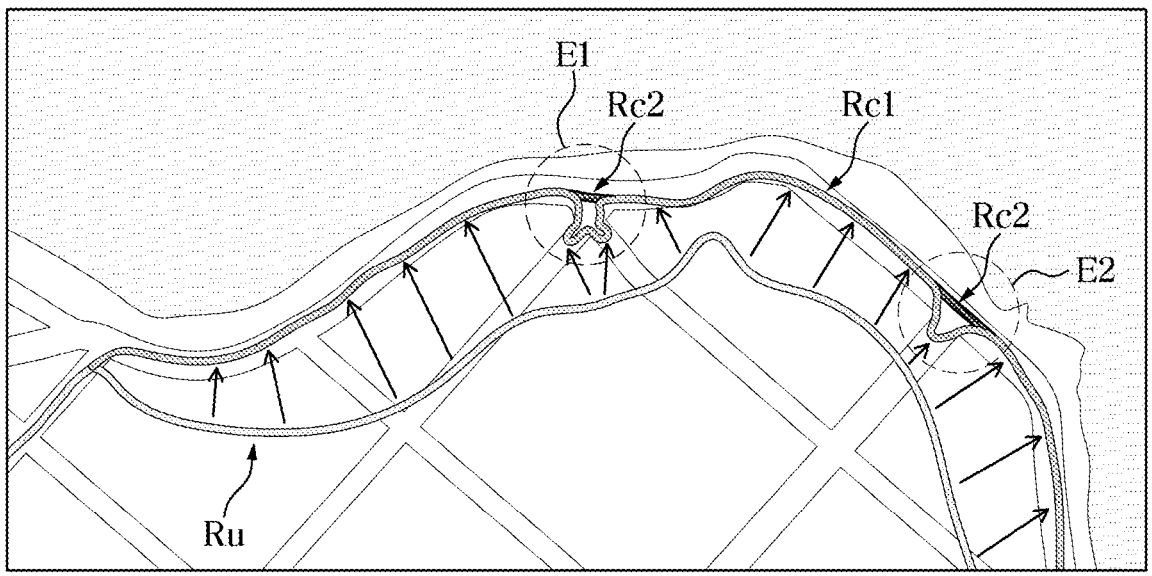
FIG. 7 illustrates a method of generating a modified route when a road deviating from a driving direction exists.
Figure 8:
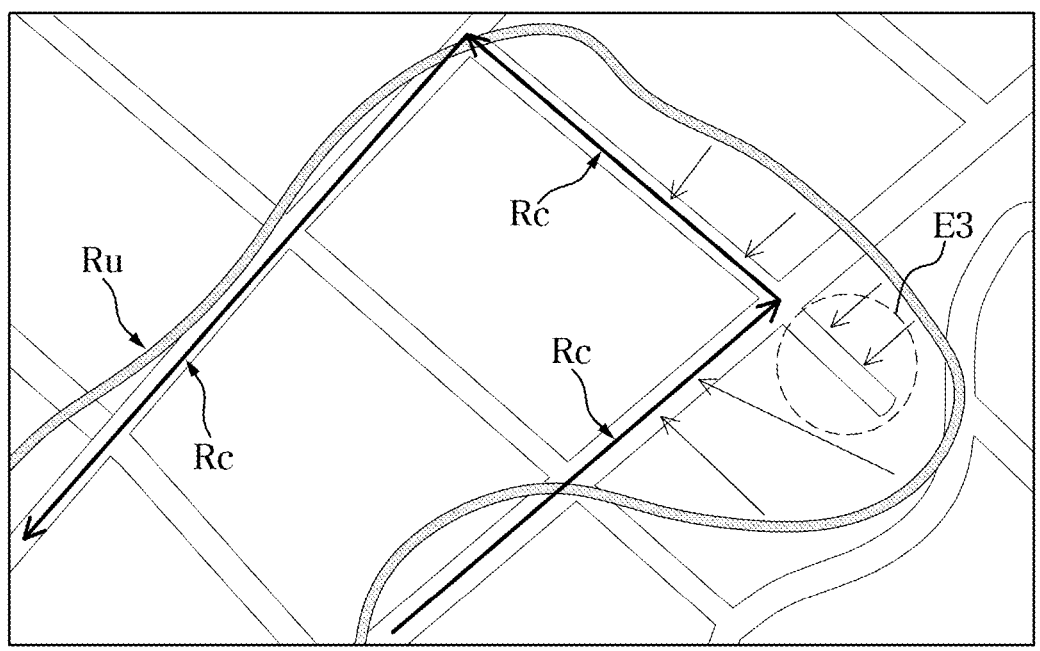
FIG. 8 illustrates a method of generating a modified route when there is a road that disconnects the route.

FIG. 6 illustrates a method of generating a modified route based on a road adjacent to a user-set route. FIG. 7 illustrates a method of generating a modified route when a road deviating from a driving direction exists. FIG. 8 illustrates a method of generating a modified route when there is a road that disconnects the route.

Referring to FIG. 6, the controller 200 of the navigation system 1 may generate a modified route Rc by giving priority to the road closest to the user-set route Ru among at least one road extracted from road information. However, when a modified route Rc is generated by giving priority to the road closest to the user-set route Ru, there may be a section that deviates from the driving direction or a section in which the route is disconnected in the modified route Rc. The section deviating from the driving direction includes a section reversing the driving direction.

Referring to FIG. 7, when the road closest to the user-set route is a road that deviates from the driving direction, the controller 200 of the navigation system 1 may generate a modified route using the next closest road among at least one road adjacent to the user-set route. For example, in FIG. 7, sections E1 and E2 that deviate from the driving direction exist in the modified route Rc1 generated by giving priority to the road closest to the user-set route Ru. Therefore, the controller 200 regenerates the modified route Rc2 of the sections E1 and E2 deviating from the driving direction by using the next closest road to the user-set route. Accordingly, a smooth route can be generated for driving.

Whether there is a road deviating from the driving direction may be determined by whether there is a section protruding from the main driving direction. Specifically, when a section that protrudes in a vertical direction with respect to the main driving direction of the modified route Rc1 is within a predetermined distance, it may be determined that a road deviating from the driving direction exists.

Referring to FIG. 8, when the road closest to the user-set route is the road that disconnects the route, the controller 200 of the navigation system 1 may generate a modified route using the next closest road among at least one road adjacent to the user-set route. In FIG. 8, in the road closest to the user-set route Ru, there is a road E3 that disconnects the route. Therefore, the controller 200 generates a modified route Rc using the next closest road to the user-set route. Accordingly, a smooth route can be generated for driving.

Figure 9:
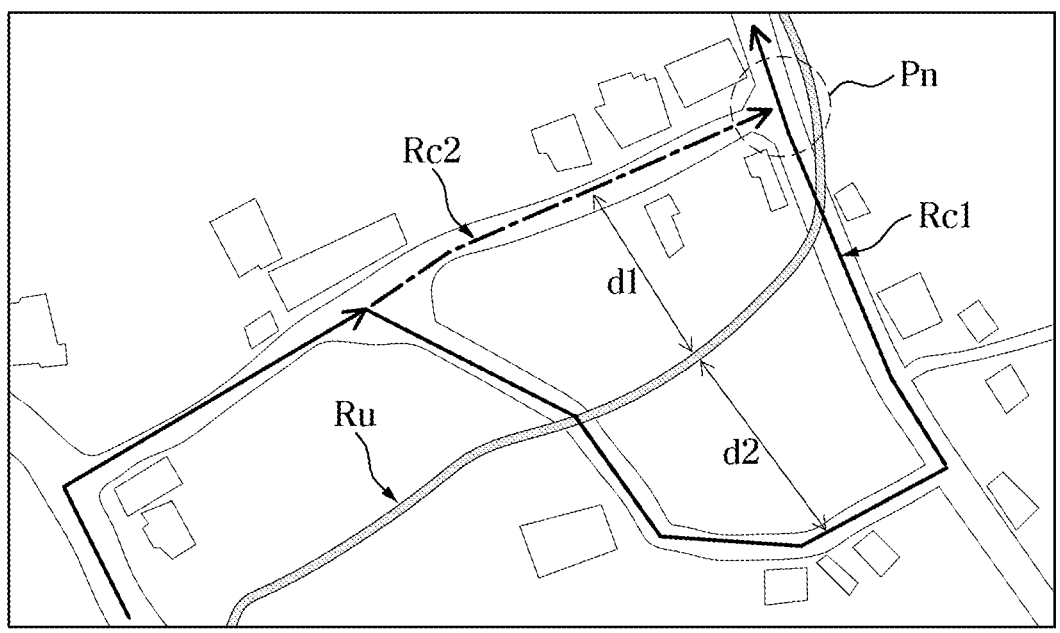
FIG. 9 illustrates a method of generating a modified route when a plurality of roads adjacent to one section of a user-set route exist.

FIG. 9 illustrates a method of generating a modified route when a plurality of roads adjacent to one section of a user-set route exist.

Referring to FIG. 9, when there are a plurality of roads adjacent to one section of the user-set route Ru and the difference between the distances from the user-set route Ru to the plurality of roads is less than a predetermined value, the controller 200 of the navigation system 1 can select a road that shortens the length of the modified route.

For example, in FIG. 9, two roads adjacent to one section of a user-set route Ru may exist. The distance from one section of the user-set route Ru to the upper road may be d1, and the distance to the lower road may be d2. And d1 and d2 may be the same, or the difference between d1 and d2 may be smaller than a predetermined value. In this case, the controller 200 may determine a route having a shorter length among the lower modified route Rc1 and the upper modified route Rc2 as the final modified route. The point Pn where the lower modified route Rc1 and the upper modified route Rc2 corresponding to one section of the user-set route Ru meet the next section is the same. However, since the upper modified route Rc2 has a shorter length and is closer to the next section, the upper modified route Rc2 can be determined as a final modified route.

Figure 10:
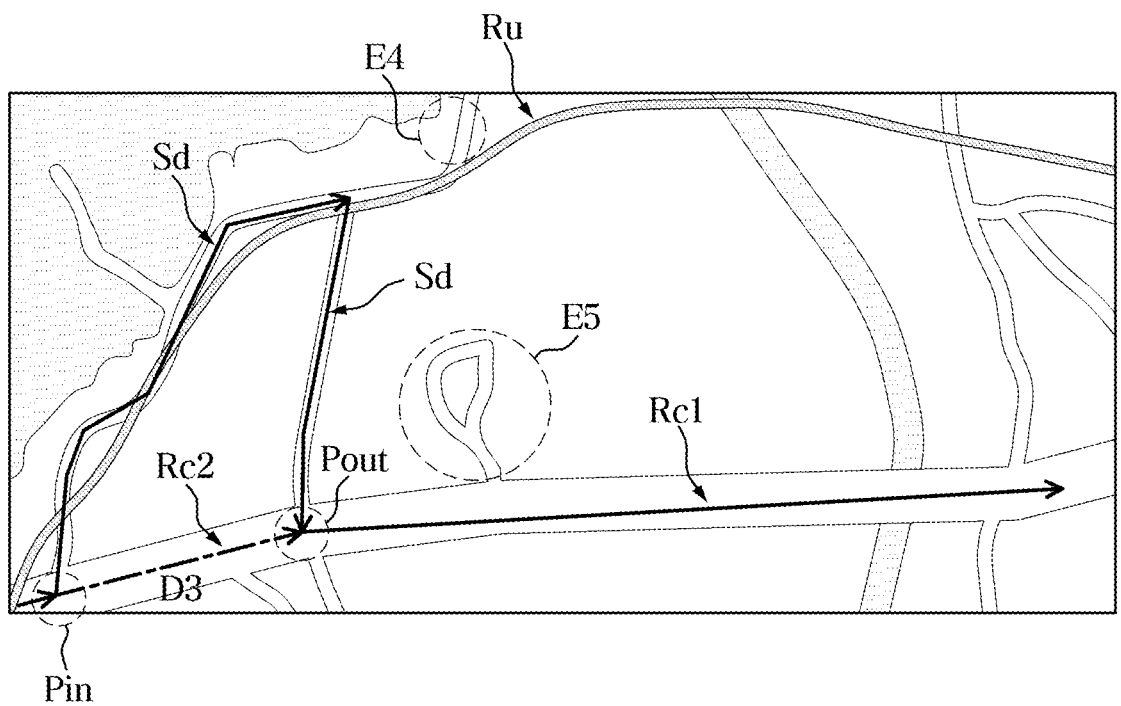
FIG. 10 illustrates a method of generating a modified route when a detour section for a straight road exists.

FIG. 10 illustrates a method of generating a modified route when a detour section for a straight road exists.

Referring to FIG. 10, when there is a detour section Sd for a straight road Rc2 in the modified route Rc1, and the ratio between the length of the detour section Sd and the length of the straight line D3 connecting the starting point Pin and the endpoint Pout of the detour section Sd is greater than the predetermined value, the controller 200 of the navigation system 1 may determine a final modified route using a straight road Rc2.

For example, in FIG. 10, the E4 road is the closest road to the user-set route Ru, but corresponds to a road that disconnects the route because there is no continuous road. E5 road is the second closest road to the user-set route Ru, but it is also a road that disconnects the route. Therefore, when generating a modified route, E4 and E5 roads are excluded, and a modified route Rc1 is generated using the next closest road to the user-set route Ru. Accordingly, a detour section Sd exists in the modified route Rc1.

However, since there is a straight road Rc2 for the detour section Sd, the road of the detour section Sd is the closest road to the user-set route Ru, but increases the length of the modified route Rc1 excessively. In this case, the driving distance may increase unnecessarily. Therefore, if the ratio between the length of the detour section Sd and the length of the straight road Rc2 is greater than the predetermined value, the final modified route is determined using the straight road Rc2. That is, the final modified route is determined as Rc2 and Rc1.

Figure 11:
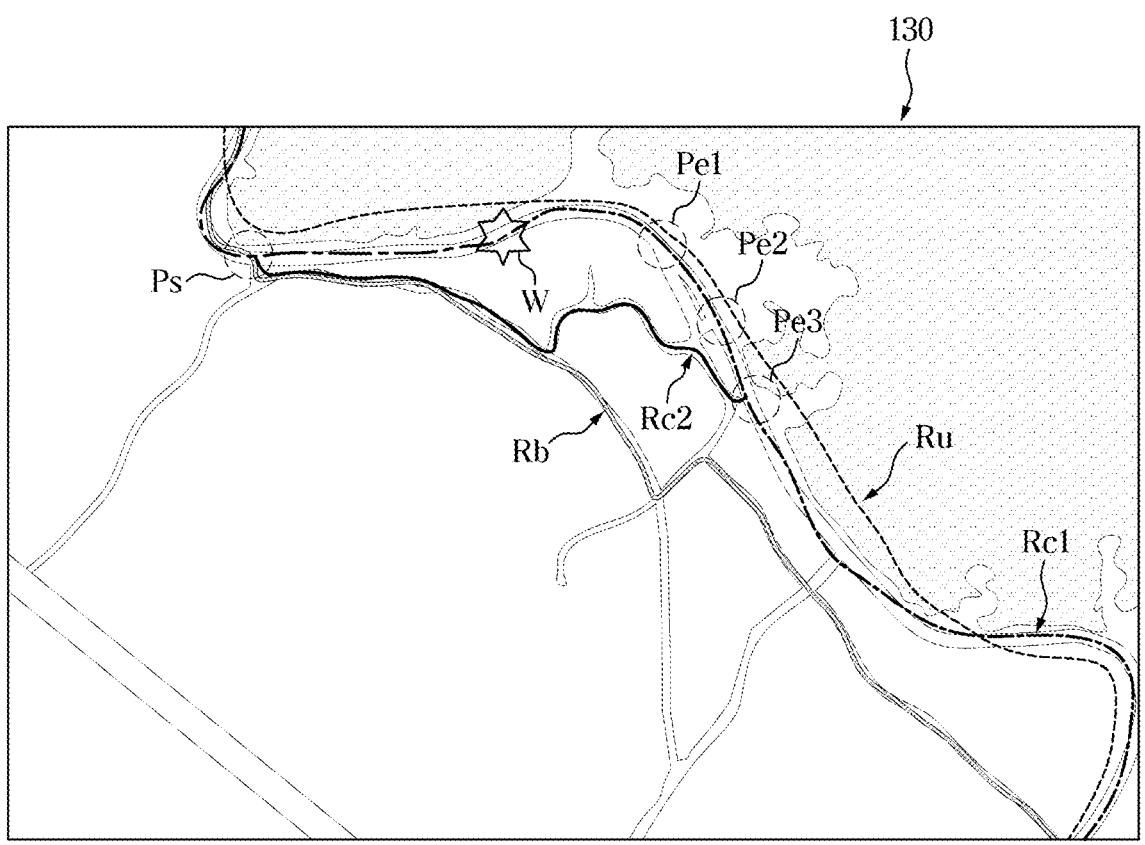
FIG. 11 illustrates a method of generating a modified route when a no-traffic road exists.

FIG. 11 illustrates a method of generating a modified route when a no-traffic road exists.

Referring to FIG. 11, the controller 200 of the navigation system 1 generates a basic route Rb based on a destination, and acquires a user-set route Ru through the input device 120, and generates a modified route based on a basic route Rb, a user-set route Ru, and road information.

The controller 200 may exclude a road including a no-traffic section among at least one extracted road. For example, in FIG. 10, a modified route Rc1 generated based on a road adjacent to the user-set route Ru may include a no-traffic section W. Since the road including the no-traffic section W is a road that vehicles cannot enter, the modified route Rc1 generated based on this is an inappropriate route. Therefore, it is necessary to generate a modified route Rc1 using a different road except for the road including the no-traffic section W.

A road including a no-traffic section W is not actually a disconnected road, but can be treated the same as a road that disconnects the route. Therefore, the controller 200 can generate a modified route using the next closest road to the user-set route Ru except for the road including the no-traffic section W.

In addition, the controller 200 checks the entry point Ps of the avoidance route and the exit point Pe1, Pe2, Pe3 of the avoidance route to avoid the no-traffic section W from the road information, and may determine the shortest distance avoidance route Rc2. Therefore, final modified routes can be Rc2 and Rc1.

Figure 12:
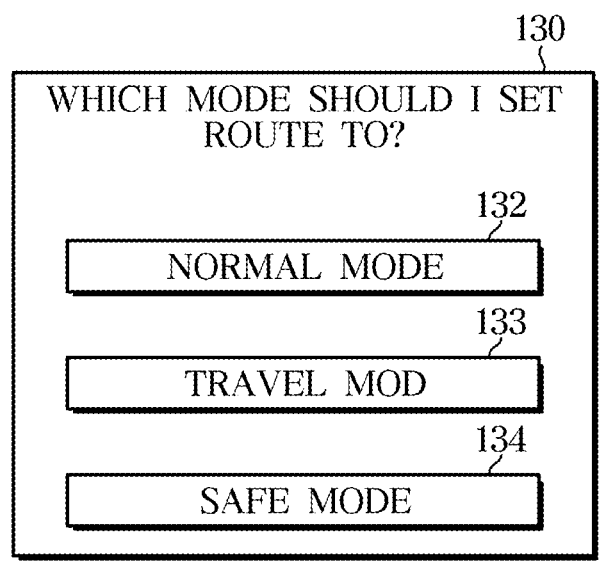
FIG. 12 illustrates an example in which a screen guiding selection of a route modification mode is displayed on the display.

FIG. 12 illustrates an example in which a screen guiding selection of a route modification mode is displayed on the display.

Referring to FIG. 12, the controller 200 of the navigation system 1 may control the display 130 to guide selection of a route modification mode. The controller 200 may generate a modified route by further reflecting the route modification mode selected through the input device 120.

The route modification mode may include normal mode, travel mode and safe mode. The normal mode is defined as a mode that generates a modified route based on the road adjacent to the user-set route. The travel mode is defined as a mode that generates a modified route by giving priority to at least one of a coastal road or a riverside road. Also, safe mode is defined as a mode that generates modified route by further excluding traffic delay roads.

When travel mode is selected, the controller 200 further extracts at least one of a coastal road or a riverside road from road information, and may generate a modified route by giving priority to at least one of a coastal road or a riverside road. However, when the difference between the distance from the user-set route to the coastal road or riverside road and the distance from the user-set route to the nearest road is smaller than the predetermined value, a modified route may be generated giving priority to at least one of a coastal road or a riverside road.

When the safe mode is selected, the controller 200 may check a traffic delay road from road information, and may exclude a traffic delay road when the traffic delay road is included in at least one extracted road. In the safe mode, the controller 200 may determine the traffic delay road as a no-traffic section. For example, when the driving speed on a highway is less than 30 km/h, and when the driving speed on a general road is less than 15 km/h, it may be determined as traffic delay.

Figure 13:
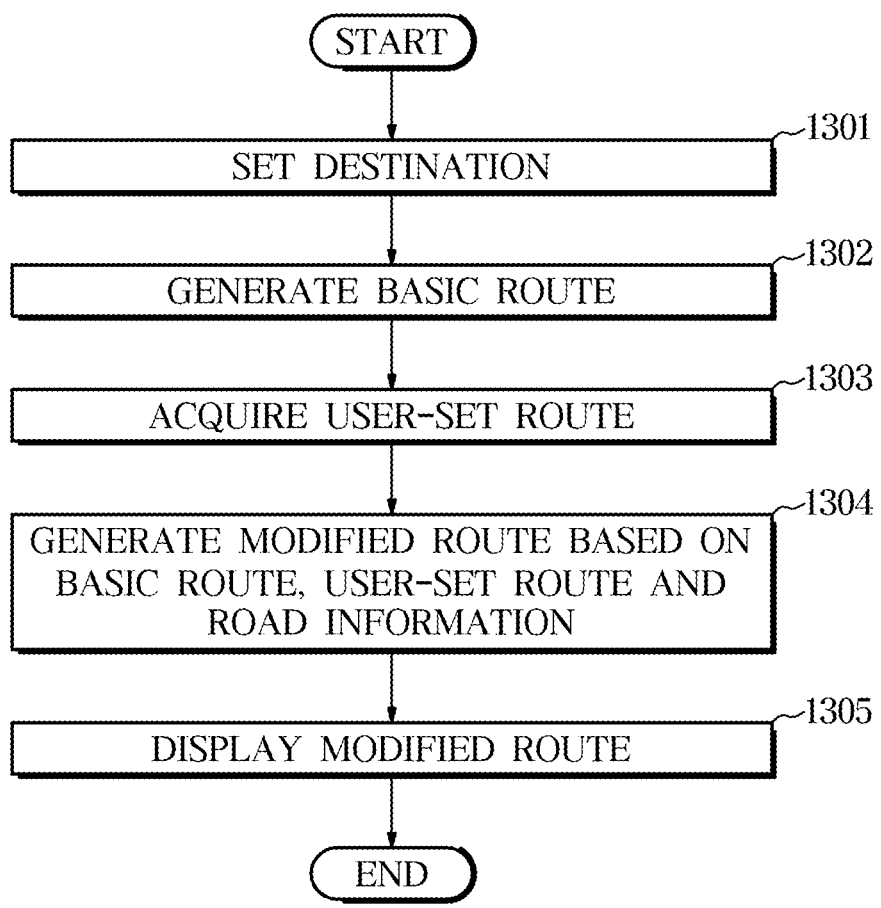
FIG. 13 is a flowchart illustrating a control method of a navigation system in one form of the present disclosure.

FIG. 13 is a flowchart illustrating a control method of a navigation system in some forms of the present disclosure.

Referring to FIG. 13, the controller 200 of the navigation system 1 may set a destination (1301). The destination may be input from a user through the input device 120. The controller 200 may generate a basic route based on the destination (1302). The basic route may be an optimal route including a shortest distance route or a minimum time route.

Also, the controller 200 may acquire a user-set route through the input device 120 (1303). The controller 200 may determine a user's drawing input input to the display 130 including the touch screen as a user-set route.

Next, the controller 200 may generate a modified route based on the basic route, user-set route, and road information (1304). The controller 200 may extract at least one road adjacent to the user-set route from road information, and generate a modified route based on the extracted at least one road. The controller 200 may generate a modified route by giving priority to a road closest to a user-set route among at least one road extracted from road information.

When the road closest to the user-set route is a road that deviates from the driving direction or a road that disconnects the route, the controller 200 may generate a modified route using the next closest road among at least one road adjacent to the user-set route.

In addition, when a plurality of roads adjacent to one section of the user-set route Ru exist, and the difference between the distances from the user-set route Ru to the plurality of roads is smaller than a predetermined value, the controller 200 may select a road that shortens the length of the modified route.

In addition, when a detour section for a straight road exists in the modified route and the ratio of a length of the detour section and a length of a straight line connecting a starting point and an endpoint of the detour section is greater than a predetermined value, the controller 200 may determine a final modified route using the straight road.

Also, the controller 200 may exclude a road including a no-traffic section among at least one extracted road.

The controller 200 may control the display 130 to display the modified route (1305).

FIG. 14 is a flowchart illustrating in more detail a control method of a navigation system in some forms of the present disclosure.

Referring to FIG. 14, the controller 200 of the navigation system 1 may set a destination (1401). The destination may be input from a user through the input device 120. The controller 200 may generate a basic route based on the destination (1402). The basic route may be an optimal route including a shortest distance route or a minimum time route.

Next, the controller 200 may receive an execution command of the route modification function (1403). An execution command of the route modification function may be input by the route modification button 131 displayed on the display 130.

The controller 200 may acquire a user-set route through the input device 120 in response to an execution command of the route modification function (1404). That is, the user can input a user-set route after pressing the route modification button 131. The controller 200 may determine a user's drawing input input to the display 130 including the touch screen as a user-set route.

Next, the controller 200 may receive a selection of the route modification mode through the input device 120 (1405). The controller 200 may control the display 130 to guide selection of a route modification mode.

The controller 200 may generate a modified route based on the basic route, user-set route, road information, and the selected route modification mode (1406). The controller 200 may control the display 130 to display the modified route (1407).

The disclosed navigation system and control method thereof can provide a route desired by a user. Specifically, the disclosed navigation system and control method thereof can easily provide a driving route closest to a route arbitrarily input by a user. Accordingly, the disclosed navigation system and control method thereof can increase user satisfaction when the user wants to arbitrarily change a driving route.

Meanwhile, some forms of the present disclosure may be implemented in the form of a recording medium storing instructions that are executable by a computer. The instructions may be stored in the form of a program code, and when executed by a processor, the instructions may generate a program module to perform operations of some forms of the present disclosure. The recording medium may be implemented as a computer-readable recording medium.

The computer-readable recording medium may include all kinds of recording media storing commands that can be interpreted by a computer. For example, the computer-readable recording medium may be ROM, RAM, a magnetic tape, a magnetic disc, flash memory, an optical data storage device, etc.

The exemplary forms of the disclosure have thus far been described with reference to the accompanying drawings. It will be obvious to those of ordinary skill in the art that the disclosure may be practiced in other forms than the exemplary forms as described above without changing the technical idea or essential features of the disclosure. The disclosed forms are illustrative and should not be construed as limiting.

What is claimed is:

1. A navigation system comprising:
an input device that includes a touch screen; and
a controller configured to:
  generate a basic route based on a starting point and a destination input received through the input device;
  acquire a user-set route received through the input device, the user-set route comprising a route from the starting point to the destination drawn by a user on the touch screen;
  generate a modified route based on the basic route, the user-set route and road information by:
  extracting at least one road adjacent to the user-set route from the road information;
  generating the modified route based on the extracted at least one road; and
  when a plurality of roads adjacent to one section of the user-set route exists and a difference between distances from the user-set route to the plurality of roads is less than a predetermined value, selecting a road from the plurality of roads that shortens a length of the modified route; and
  cause the modified route to be displayed.

2. The navigation system of claim 1, wherein the controller is configured to generate the modified route by giving priority to a road closest to the user-set route among the extracted at least one road.

3. The navigation system of claim 2, wherein the controller is configured to, when the road closest to the user-set route is a road that deviates from a driving direction or a road that disconnects the route, generate the modified route using a next closest road among the extracted at least one road.

4. The navigation system of claim 1, wherein the controller is configured to, when a detour section for a straight road exists in the modified route and a ratio between a length of the detour section and a length of a straight line connecting a starting point and an endpoint of the detour section is greater than a predetermined value, determine a final modified route using the straight road.

5. The navigation system of claim 1, wherein the controller is configured to exclude a road including a no-traffic section from among the extracted at least one road.

6. The navigation system of claim 1, wherein the controller is configured to:
receive a selection of a route modification mode, wherein the route modification mode includes a normal mode, a travel mode and a safe mode; and
generate the modified route based on the received selection.

7. The navigation system of claim 6, wherein the controller is configured to:
extract at least one of a coastal road or a riverside road from the road information when the travel mode is selected; and
generate the modified route by giving priority to at least one of the coastal road or the riverside road.

8. The navigation system of claim 6, wherein the controller is configured to:
check a traffic delay road in the road information when the safe mode is selected; and
exclude the traffic delay road when the traffic delay road is included in the extracted at least one road.

9. A method of operating a navigation system, the method comprising:
generating a basic route based on a starting point and a destination input received from a user;
acquiring a user-set route received through a touch screen input device, the user-set route being received based on drawing on the touch screen input device from the starting point to the destination;
generating a modified route based on the basic route, the user-set route and road information, wherein generating the modified route comprises:
extracting at least one road adjacent to the user-set route from the road information;
generating the modified route based on the extracted at least one road; and
when a plurality of roads adjacent to one section of the user-set route exists and a difference between distances from the user-set route to the plurality of roads is less than a predetermined value, selecting a road from the plurality of roads that shortens a length of the modified route; and
displaying the modified route.

10. The method of claim 9, wherein generating the modified route further comprises generating the modified route by giving priority to a road closest to the user-set route among the extracted at least one road.

11. The method of claim 10, wherein generating the modified route further comprises, when the road closest to the user-set route is a road that deviates from a driving direction or a road that disconnects the user-set route, generating the modified route using a next closest road among the extracted at least one road.

12. The method of claim 9, wherein generating the modified route further comprises, when a detour section for a straight road exists in the modified route and a ratio between a length of the detour section and a length of a straight line connecting a starting point and an endpoint of the detour section is greater than a predetermined value, determining a final modified route using the straight road.

13. The method of claim 9, wherein generating the modified route further comprises excluding a road comprising a no-traffic section from among the extracted at least one road.

14. The method of claim 9, further comprising:
receiving a selection of a route modification mode, wherein the route modification mode includes a normal mode, a travel mode and a safe mode; and
generating the modified route based on the route modification mode.

15. The method of claim 14, wherein generating the modified route further comprises:
extracting at least one of a coastal road or a riverside road from the road information when the travel mode is selected; and
generating the modified route by giving priority to at least one of the coastal road or the riverside road.

16. The method of claim 14, wherein generating the modified route further comprises:
checking a traffic delay road in the road information when the safe mode is selected; and
excluding the traffic delay road when the traffic delay road is included in the extracted at least one road.

17. A method of operating a navigation system that includes an input device having a touch screen user interface, the method comprising:
generating a basic route based on a starting point and a destination;
acquiring a user-set route received through the touch screen user interface, the user-set route being received based on drawing on the touch screen user interface from the starting point to the destination;
receiving a selection of a route modification mode from the input device, the route modification mode including a normal mode, a travel mode and a safe mode;
extracting at least one road adjacent to the user-set route from road information;
generating a modified route based on the basic route, the user-set route, the route modification mode, and the extracted at least one road;
when a plurality of roads adjacent to one section of the user-set route exists and a difference between distances from the user-set route to the plurality of roads is less than a predetermined value, selecting a road from the plurality of roads that shortens a length of the modified route; and
displaying the modified route on the touch screen user interface.

18. The method of claim 17, wherein generating the modified route comprises giving a high priority to a coastal road or a riverside road when the selection is the travel mode and giving a low priority to a road with a traffic delay road when the selection is the safe mode.

* * * * *